Aug. 5, 1952     D. A. HENGGELER     2,605,976
WIRE ROLLER ATTACHMENT FOR TRACTORS
Filed Jan. 24, 1950     2 SHEETS—SHEET 1
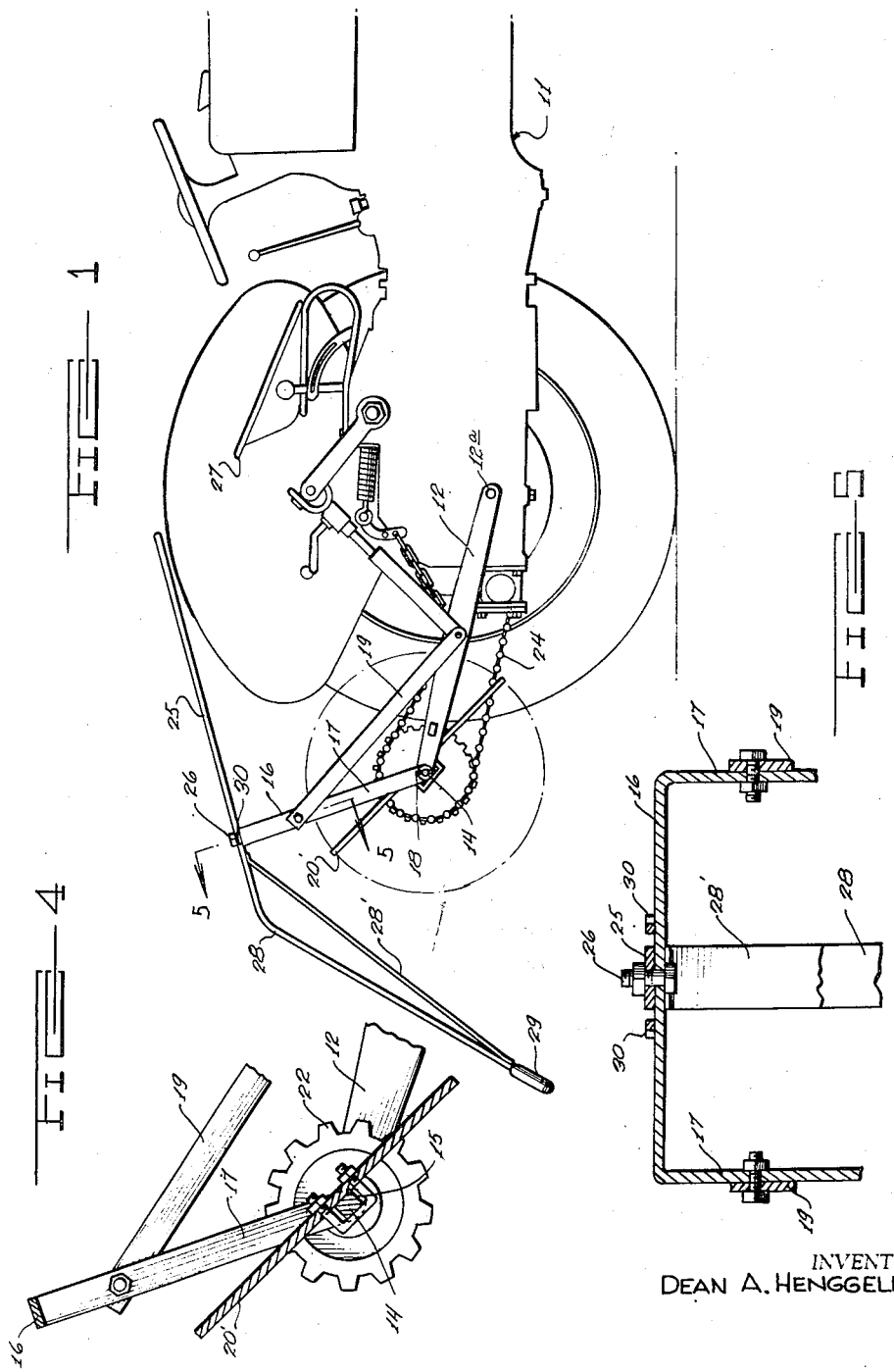
INVENTOR
DEAN A. HENGGELER
BY
McMorrow, Berman & Davidson
ATTORNEYS

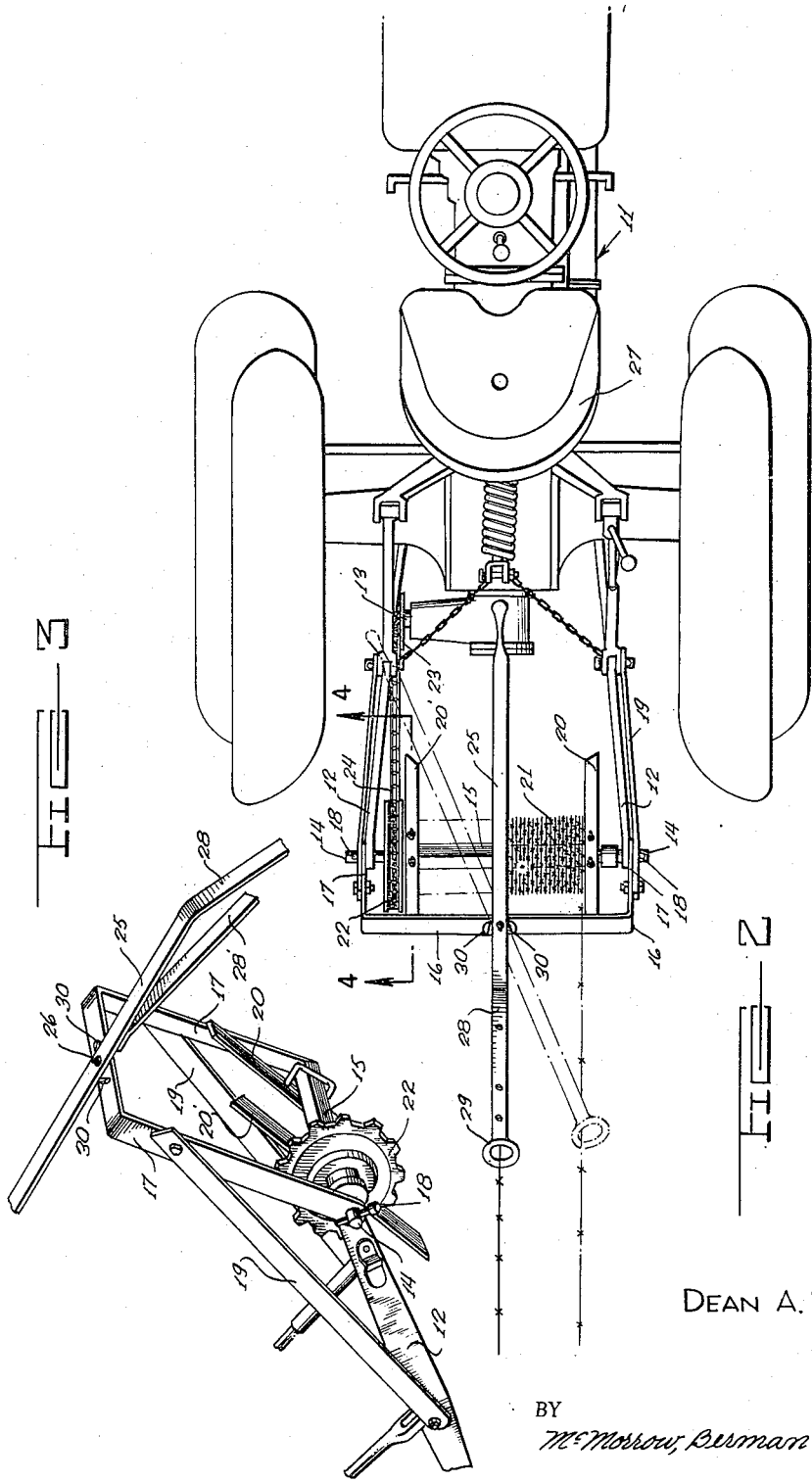

Patented Aug. 5, 1952

2,605,976

UNITED STATES PATENT OFFICE 2,605,976

WIRE ROLLER ATTACHMENT FOR TRACTORS

Dean A. Henggeler, Lincoln, Nebr.

Application January 24, 1950, Serial No. 140,175

3 Claims. (Cl. 242—92)

This invention relates to wire reeling apparatus, and more particularly to a wire reeling attachment for use with a farm tractor.

A main object of the invention is to provide a novel and improved wire reeling attachment for a tractor which is very simple in construction, which is easy to install on a tractor, and which enables the operator to control the placement of the wire on the shaft of the attachment.

A further object of the invention is to provide an improved wire reeling attachment for use with a conventional farm tractor, said attachment being inexpensive to fabricate, involving only a few parts, being rugged in construction, and enabling the wire to be closely wound thereon.

Further objects and advantages of the invention will become apparent from the following description and claims and from the accompanying drawings, wherein:

Figure 1 is a side elevational view of the rear portion of a tractor showing an improved wire reeling attachment constructed in accordance with the present invention mounted on the tractor;

Figure 2 is a top plan view of the structure shown in Figure 1;

Figure 3 is a perspective view of the wire reeling attachment employed in Figures 1 and 2;

Figure 4 is an enlarged cross-sectional detail view taken on line 4—4 of Figure 2;

Figure 5 is an enlarged cross-sectional detail view taken on line 5—5 of Figure 1.

Referring to the drawings, 11 designates a conventional farm tractor provided at its rear end with a power take off or shaft 13 and a pair of rearwardly extending lift arms or bars 12 disposed in spaced parallel relation with respect to each other and mounted at one end for rotary movement in substantially vertical planes about a horizontal axis or pivot 12a, only one being shown.

The wire reeling attachment comprises a transverse shaft 14 having a squared, longitudinally tapered, intermediate portion 15. The ends of shaft 14 extend rotatably through the free or other ends of the power lift arms 12, 12. Designated at 16 is a frame or yoke member of inverted U-shape. The frame or yoke member 16 is mounted over the shaft 14 with the lower ends of the side arms 17, 17 of the yoke member rotatably receiving the ends of the shaft 14, pins 18, 18 being inserted in said ends outwardly of the lower ends of said side arms to secure the shaft with respect to the yoke member and the power lift arms 12, 12, as shown in Figure 2. Strut means connected to the frame or yoke member 16 supports the latter with the bight spaced above the shaft 14, such means embodying strut bars 19 which connect the upper portions of the side arms 17, 17 to the intermediate portions of the respective side arms 12, 12, whereby the yoke member 16 is secured in a fixed position with respect to said side arms.

Clamped to the squared portion 15 of the shaft at locations spaced a short distance inwardly of the respective side arms 17, 17 are respective stop bars 20, 20', defining between them a space on the squared portion 15 whereon wire may be coiled, as shown at 21 in Figure 2. Secured on shaft portion 15 is a sprocket wheel 22 which is located in longitudinal alignment with a smaller sprocket wheel 23 mounted on the power take-off shaft 13. A sprocket chain 24 is engaged over the sprocket wheels 22, 23.

Designated at 25 is a long lever bar which is pivotally connected intermediate its ends to the intermediate portion of the crossarm of the yoke member or frame 16 for rocking movement from side to side about an axis or pin 26 perpendicular to the shaft 14. The forward end of the bar 25 extends adjacent the driver's seat 27 of the tractor. The rear end portion of the bar 25 is bent downwardly at 28 and is formed with an enlarged eye 29 disposed at a slightly lower level than the shaft 14, as shown in Figure 1. The rear portion of bar 25 is stiffened by a brace bar 28'. The crossarm of yoke member 16 is formed on opposite sides of bar 25 with upstanding lugs 30, 30 limiting the degree of rotation of bar 25 to positions wherein the eye 29 is always between the longitudinal vertical planes of the stop bars 20, 20'.

In operation, the wire to be reeled is first passed through the eye 29 and then secured on the squared shaft portion 15. The power take-off shaft 13 is then energized, causing the wire to be wrapped on the squared shaft portion. The wire may be guided during reeling by the lever bar 25, whereby the turns of the wire may be closely spaced and whereby the wire may be wound from stop bar 20 to stop bar 20' and vice versa, forming successive layers until the wire is completely coiled. In this manner, the wire may be wound up with a minimum amount of handling, thereby minimizing the risk of injury to the operator from the barbs of the wire.

The above-described attachment may be employed for reeling various types of wire other than barbed wire, using the same procedure above described.

The squared shaft portion is longitudinally tapered to facilitate unreeling of wire therefrom.

While a specific embodiment of an improved wire reeling attachment for a tractor has been disclosed in the foregoing description, it will be understood that various modifications within the spirit of the invention may occur to those skilled in the art. Therefore, it is intended that no limitations be placed upon the invention except as defined by the scope of the appended claims.

What is claimed is:

1. A wire reeling attachment for a tractor including a power takeoff and a pair of rearwardly extending lift bars disposed in spaced parallel relation with respect to each other and mounted at one end for rotary movement in substantially vertical planes about a horizontal axis, said attachment comprising a shaft passing through said pair of lift bars at the other ends thereof and mounted for rotary movement thereon, means drivingly connecting said shaft to said power takeoff, an inverted U-shaped frame having its legs disposed transversely of said shaft and connected thereto contiguous to the ends thereof, a pair of stop bars disposed in spaced parallel relation with respect to each other and supported on said shaft transversely thereof and spaced inwardly of the legs of said frame for receiving therebetween the wire to be reeled, a lever having one end extending forwardly of the tractor toward the driver's seat thereof and having the other end extending rearwardly of and below said shaft and mounted intermediate its ends on said frame for rocking movement from side to side about an axis perpendicular of said shaft, and a guide eyelet carried by said rearwardly projecting end of said lever for the extension therethrough of the wire to be reeled, whereby said lever can be rocked from side to side by the driver, to thereby space the turns of wire being reeled onto the shaft between the stop bars.

2. A wire reeling attachment for a tractor including a power takeoff and a pair of rearwardly extending lift bars disposed in spaced parallel relation with respect to each other and mounted at one end for rotary movement in substantially vertical planes about a horizontal axis, said attachment comprising a shaft passing through said pair of lift bars at the other ends thereof and mounted for rotary movement thereon, means drivingly connecting said shaft to said power takeoff, an inverted U-shaped frame having its legs disposed transversely of said shaft and connected thereto contiguous to the ends thereof, strut means connected to said frame for supporting the latter with the bight thereof spaced above said shaft, a pair of stop bars disposed in spaced parallel relation with respect to each other and supported on said shaft transversely thereof and spaced inwardly of the legs of said frame for receiving therebetween the wire to be reeled, a lever having one end extending forwardly of the tractor toward the driver's seat thereof and having the other end extending rearwardly of and below said shaft and mounted intermediate its ends on said frame for rocking movement from side to side about an axis perpendicular to said shaft, and a guide eyelet carried by said rearwardly projecting end of said lever for the extension therethrough of the wire to be reeled, whereby said lever can be rocked from side to side by the driver, to thereby space the turns of wire being reeled onto the shaft between the stop bars.

3. A wire reeling attachment for a tractor including a power takeoff and a pair of rearwardly extending lift bars disposed in spaced parallel relation with respect to each other and mounted at one end for rotary movement in substantially vertical planes about a horizontal axis, said attachment comprising a shaft passing through said pair of lift bars at the other ends thereof and mounted for rotary movement thereon, means drivingly connecting said shaft to said power takeoff, an inverted U-shaped frame having its legs disposed transversely of said shaft and connected thereto contiguous to the ends thereof, strut means connected to said frame for supporting the latter with the bight thereof spaced above said shaft, a pair of stop bars disposed in spaced parallel relation with respect to each other and supported on said shaft transversely thereof and spaced inwardly of the legs of said frame for receiving therebetween the wire to be reeled, a lever having one end extending forwardly of the tractor toward the driver's seat thereof and having the other end extending rearwardly of and below said shaft and mounted intermediate its ends on said frame for rocking movement from side to side about an axis perpendicular to said shaft, a guide eyelet carried by said rearwardly projecting end of said lever for the extension therethrough of the wire to be reeled, whereby said lever can be rocked from side to side by the driver, to thereby space the turns of wire being reeled onto the shaft between the stop bars, and means on said frame and engaging said lever for limiting the rocking movement of the latter.

DEAN A. HENGGELER.

REFERENCES CITED

The following references are of record in the file of this patent:

UNITED STATES PATENTS

| Number | Name | Date |
| --- | --- | --- |
| Re. 22,912 | Gaertner | Sept. 9, 1947 |
| 462,898 | Gandy | Nov. 10, 1891 |
| 516,894 | List | Mar. 20, 1894 |
| 692,412 | Austin | Feb. 4, 1902 |
| 695,351 | Thompson | Mar. 11, 1902 |
| 788,133 | Harrison | Apr. 25, 1905 |
| 1,054,313 | Richardson | Feb. 25, 1913 |
| 1,132,622 | Schulz | Mar. 23, 1915 |
| 1,813,831 | Wessler | July 7, 1931 |
| 2,501,390 | Jeffreys | Mar. 21, 1950 |